Aug. 1, 1939.　　　O. C. KALBFLEISCH　　　2,167,981
TIRE SPREADER
Filed June 10, 1937　　　3 Sheets-Sheet 1

INVENTOR.
Oscar C. Kalbfleisch
BY Lloyd C. Root
ATTORNEY.

Aug. 1, 1939.    O. C. KALBFLEISCH    2,167,981
TIRE SPREADER
Filed June 10, 1937    3 Sheets-Sheet 2

INVENTOR.
Oscar C. Kalbfleisch
BY
Lloyd C. Root
ATTORNEY.

Aug. 1, 1939.  O. C. KALBFLEISCH  2,167,981
TIRE SPREADER
Filed June 10, 1937   3 Sheets-Sheet 3
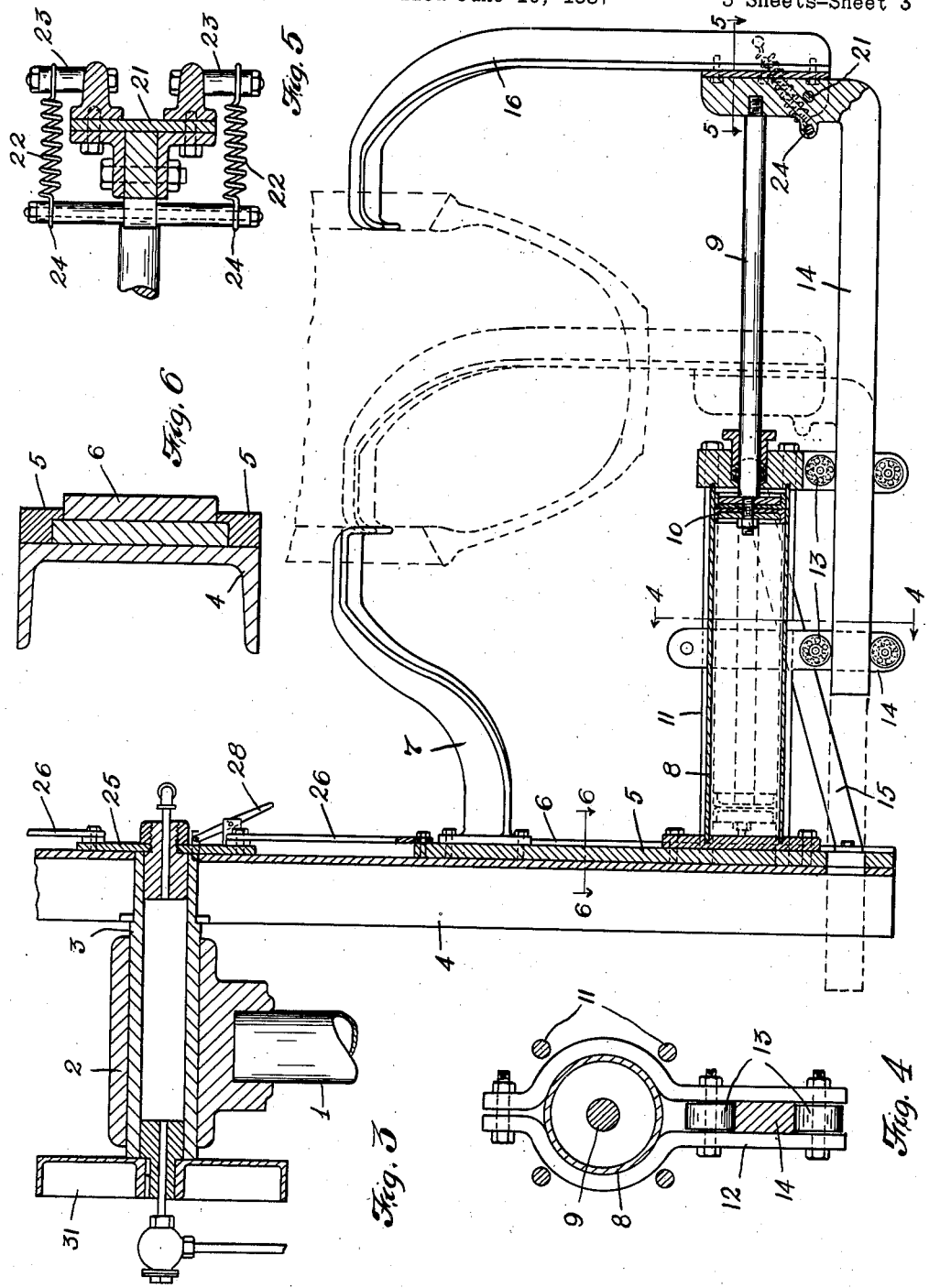
INVENTOR.
Oscar C. Kalbfleisch
BY
Lloyd C. Root.
ATTORNEY.

Patented Aug. 1, 1939

2,167,981

UNITED STATES PATENT OFFICE 2,167,981

TIRE SPREADER

Oscar C. Kalbfleisch, Mansfield, Ohio

Application June 10, 1937, Serial No. 147,522

5 Claims. (Cl. 154—9)

This invention relates, generally, to a new and important type of pneumatic lifting device, and more specifically, to a particular adaptation of that device.

The principal object of my invention is to provide a pneumatic device wherein a great amount of weight may be handled easily and quickly.

A further and more particular object of my invention is to adapt this improved lifting device to a new and improved construction of tire-spreaders, wherein any size tires may be spread easily and quickly for examination.

Another object of this invention is to provide means for rotating the tire after it has been spread and locking it in any particular position during its rotation.

Other objects of my invention will appear as the description proceeds.

To the accomplishment of the foregoing and related ends, said invention consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Fig. 3 is a part sectional part elevational view taken substantially on the line indicated by 3—3 of Fig. 2 showing the fingers in an open position.

Fig. 4 is an enlarged part sectional part elevational view taken substantially on the line indicated by 4—4 of Fig. 3.

Fig. 5 is an enlarged sectional view taken substantially on the line indicated by 5—5 of Fig. 3.

Fig. 6 is an enlarged sectional view taken substantially on the line indicated by 6—6 on Fig. 3.

Although there have been a number of pneumatic tire-spreaders manufactured heretofore, certain disadvantages have been encountered in each case. Other forms have been used such means as a central cylinder for moving the fingers apart in order to spread the tire, necessitating the use of long arms extending from such cylinders, so that the necessary amount of pull for spreading apart some of the larger and heavier truck tires cannot always be obtained.

The principle, which I have discovered, need not necessarily be limited to use on tire-spreaders of this nature, but may be adapted to any number of other uses. This principle, however, will be described herein as I have adapted it to a new and novel construction in tire-spreaders.

I have found that by placing two or more braces around a cylinder, which braces extend at approximately right angles to the cylinder and have openings therethrough to allow one arm of an L bar to slide therethrough, which L bar has its other end secured to the outer end of a piston rod, which is slidably mounted in the cylinder, an enormous pull can be exerted which may be utilized in a number of ways, as will be more clearly seen as the description proceeds. I have effectively adapted this principle to my tire-spreader.

A further advantage of my invention is the provision of a brake drum so that as the operator rotates the tire and desires to stop it in any particular position he may bring this brake into use and lock the tire in the desired place.

Figure 1:
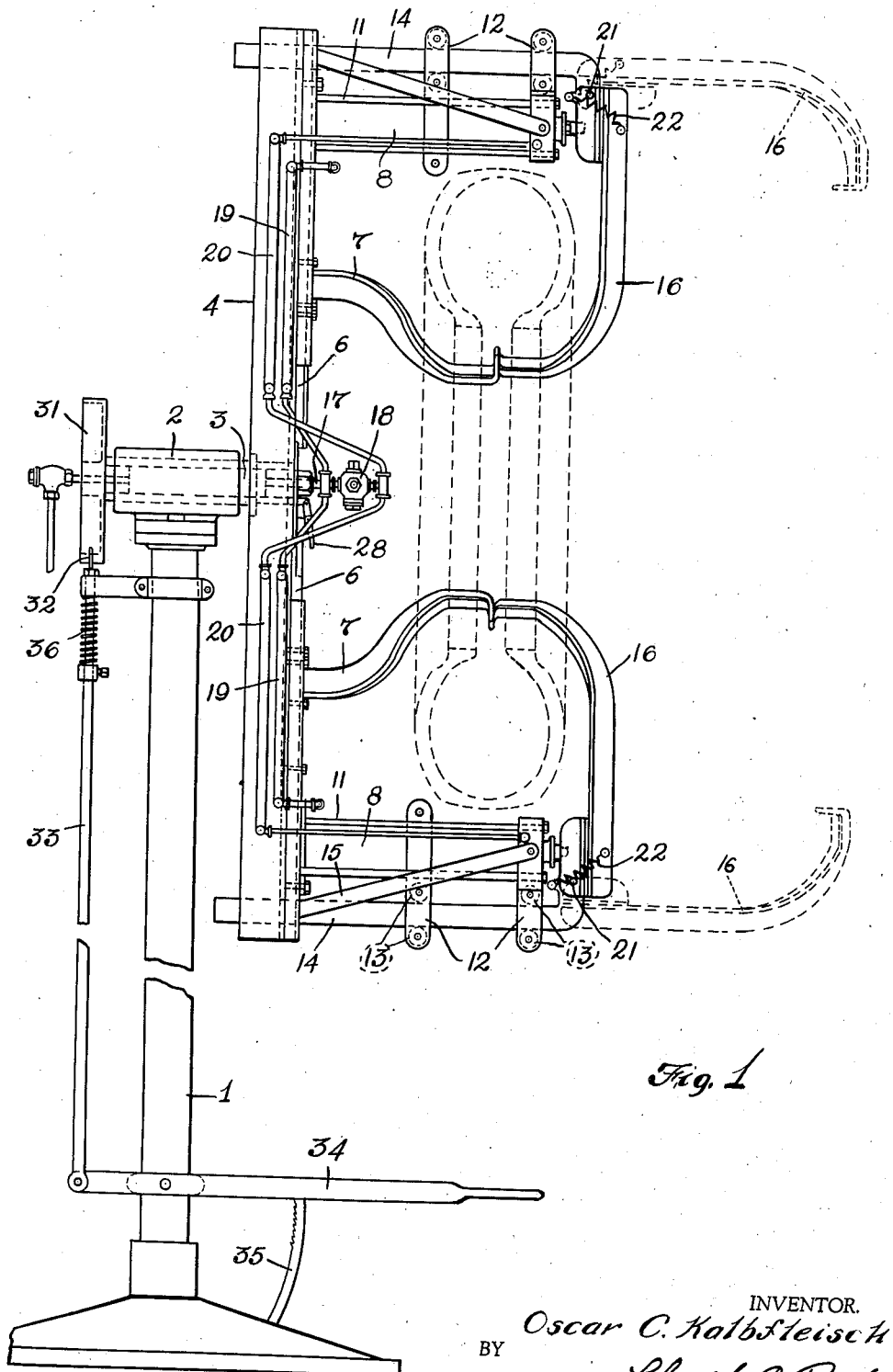
Fig. 1 shows a side view of my improved tire-spreader in a closed position.

Referring now in particular to the drawings, and more especially to Fig. 1, the standard or supporting means is indicated by the numeral 1. At the top of this standard and secured thereto in a horizontal position, is placed a bearing, 2, through which is rotatably mounted a shaft, 3. The front end of said shaft, 3, is secured to a channel or arm, 4. Guiding elements, 5, are secured to the flat surface of said channel to allow the plates or elements, 6, to slide therein. This particular construction may be more easily understood by viewing Fig. 6.

Two of these sliding elements, 6, are placed on the arm, 4, so that in a normal position of the arm one element will be slidably mounted at the top and the other at the bottom of said arm. Near the inner end of each of the elements, 6, I have placed a pair of fingers, 7. When the tire is in place, each of these fingers grip over the inside of the bead on the tire.

To the outer end of each of said elements, 6, is secured a cylinder, 8. In each of these cylinders, is slidably mounted therein a piston rod, 9, to the inner end of which is secured two cups, 10, one facing outwardly and the other inwardly so that the air may operate the piston in both directions.

In the present form I have placed a plurality of bars, 11, parallel to said cylinder, 8, in order to make the cylinder more secure, although it will be obvious that any other means for securing the cylinder in this position may be used without in any way departing from the spirit of my invention.

Around these cylinders I have placed a number of braces, 12, which extend in a direction vertical to the cylinder, as more clearly shown in Fig. 4. These braces are placed a certain distance apart in order to allow the placing therebetween of pivotally mounted bearings, 13.

Then as hereinbefore described one arm of an L bar is placed in such a manner as to contact said bearings, 13, enabling said L bar to be easily moved back and forth between said bearings.

The other arm of said L bar, 14, is secured near its end to the outer extremity of said piston rod, 9. It will be, therefore, seen from the foregoing that as said piston rod moves in its path outwardly or inwardly, it will carry with it the L bar, 14. It will be noted further that the bearings, 13, act not only to reduce friction but also as braces for the bar as well.

The principle underlying the above described pneumatic lift has to do with the fact that it is not possible to exert a very great amount of pull or lift at a point directly in line with the piston rod. It will be obvious that any amount of weight placed on the outer extremity of the piston rod would tend to lock or even bend said piston rod after it had traveled approximately half of its entire path. This I have been able to overcome to allow me to use a pneumatical cylinder of this type for exerting a great amount of force by placing the L bar as above described. Since there is very little friction between the L bar and the roller bearings, a great amount of force may be exerted at the forward end of the piston rod and said rod will be able to travel its full distance. Any force which is brought to bear or any weight which is to be lifted in this manner must necessarily be out of line with the center of the cylinder, however, it is that principle of exerting the force off center which enables me to either pull, push, or lift with a force which is impossible with any other construction.

As an additional brace for the cylinder, 8, I have placed on either side thereof bars, 15, to aid in counteracting the force which is in evidence during the movement of said piston.

To the outer end of said bar another set of fingers, 16, are secured. This set of fingers is used to contact the bead nearest the operator.

It will be seen at this point then that as far as the spreading of the tire is concerned the fingers, 7, remain stationary while the fingers, 16, move outwardly; thus, maintaining the tire in a position for examination.

Through the center of the arm, 4, extends airline, 17, which is connected to an ordinary four-way valve, 18. This valve is then connected to sets of airlines extending to each of the cylinders. The line which forces the piston outwardly is indicated by the numeral 19. After the tire has been examined and it is desired to release the pressure on said tire and allow the piston to move rearwardly to its normal position, air is allowed to pass through the line indicated by the numeral 20, which enters the front end of the cylinder and forces the piston rearwardly.

As said piston moves in its forward and rearward path it carries with it the L bar, 14, as well as the set of fingers, 16, and as long as the air pressure remains, the fingers will be maintained in an open position.

In order that the placing of the tire on these fingers may be made easier, I have secured the fingers, 16, to the L bar, 14, by means of the pivot, 21. Springs, 22, are then secured to the fingers by means of very small cylinders, 23, and to the L bar in a similar manner at points, 24. It will be seen that in their course the fingers, 16, will be maintained in that position since the springs, 22, are past the pivotal points, 21. However, as the fingers, 16, are moved into an open position, said springs will pass the pivotal points, 21, thus maintaining said fingers in the desired open position. When the fingers are in this position, no difficulty will be encountered in placing the tire on fingers, 7, which will hold it in place until the fingers, 16, are again closed and contact the bead of the tire.

Fig. 1 shows the fingers normally in a closed position. The fingers, 16, are also shown here in their open position by the dotted lines.

Fig. 3 shows the fingers as they are spread apart maintaining the tire, which is shown dotted in, in a position for examination, the closed position of the fingers being shown by dotted lines.

The range of diameters for tires usually is from 14 to 20 inches. Due to this fact, it will be obvious that some means should be provided for making larger or smaller the space between the upper and lower groups of fingers.

This has been done heretofore by a rather complicated series of gears and rotating shafts, which make the process of adjusting the fingers to the proper position a long and arduous task. I have provided simple but effective means for arriving at the same result, which includes a rotatable disk, 25.

Since the fingers, 7, and cylinders, 8, are all mounted on the sliding member, 6, it merely becomes necessary to provide some means for moving these elements nearer to and farther from each other. To do this I have provided links, 26, which are pivotally secured at one end to said disk, 25, and at the other end to the sliding members, 6, as more clearly shown in Fig. 2. The disk, 25, is calibrated and is provided with an arrow, 27, so that when the disk, 25, is rotated the number appearing below the arrow at any particular time will be the distance in inches from the upper to the lower groups of fingers.

Immediately back of said disk small holes are placed in the channel member, 4. On the front side of said disc is secured a handle or arm, 28, which handle may be used to rotate said disk and thus move the sliding members, 6, toward or away from each other. On the front side of said handle, 28, is placed a rocker arm, 29, the forward end of which is bent in such a manner as to extend through a hole, 30, in the handle and into another hole coincident therewith in the disk. Said handle is maintained in its normal position with its forward end extending through the aforementioned holes and into the openings provided in said arm, 4, thus maintaining the disk and the sliding elements in any desired position.

The operation of this particular feature will then be first to determine the size of the tire to be examined then set the disk so that the proper number falls in line with the arrow, 27. The fingers, 7 and 16, will then be the proper distance apart for the particular tire to be examined. It will be seen from the foregoing that the means I have provided for adjusting the distance between the fingers may be operated quickly and easily saving a considerable amount of time in the process of placing a tire on the spreader for examination purposes.

It should be noted at this point that the tips of the fingers, 7, as well as of the fingers, 16, are all an equal distance apart when they are in a position nearest each other. Although this is not necessary, it was thought advisable in order to give a more equal spread to the tire while it is being examined.

Figure 2:
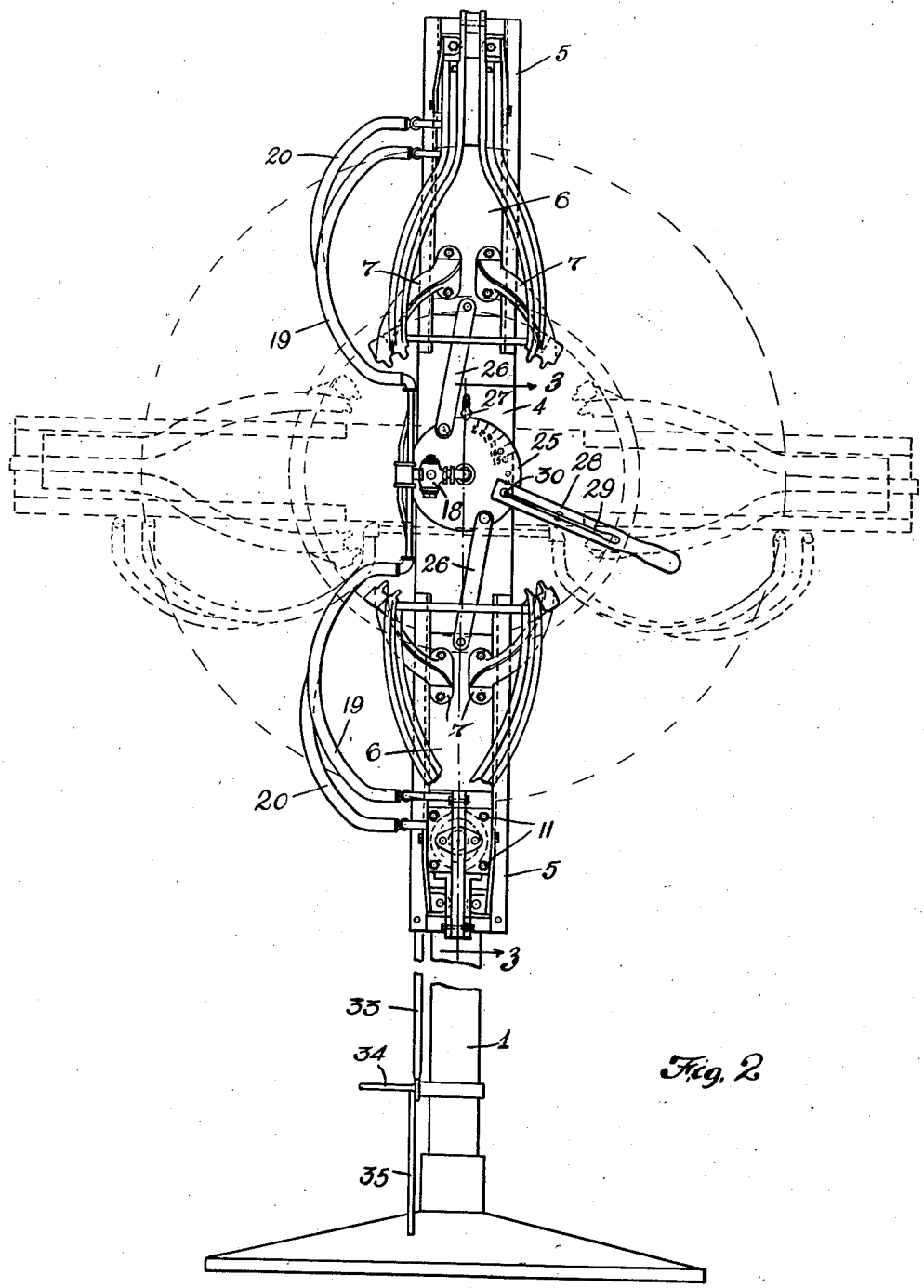
Fig. 2 shows a front view of my invention.

As beforementioned, the shaft, 3, is pivotally mounted in the bearing, 2; and since the arm, 4, is secured to the forward end of said shaft, 3, the arm, 4, will be able to be rotated throughout an entire 360°. Furthermore, since all of the other described means, such as the fingers and the cylinders, are also secured to the arm, 4, they may all be rotated in the same manner. This enables the operator, after placing the tire on the fingers and having said tire spread open for examination, to rotate the entire apparatus and view clearly all of the inside of said tire. Fig. 2 discloses more clearly, by means of the dotted lines, the position of the apparatus as it has been revolved through a 90° arc.

It may be desirable, in certain instances, after the device has been rotated through said arc, to lock the entire appaartus in this position. For this purpose I have provided a brake drum, 31, which is secured to the rear extremity of the shaft, 3, and is rotated therewith. Beneath said brake drum I have provided a small shoe, 32, having the same curvature as the brake drum, which shoe is secured to the end of a rod, 33, which is pivotally secured to an arm, 34. When said arm, 34, is placed downwardly, it forces the rod, 33, and shoe, 32, upwardly into contact with said brake drum, 31. The arm, 34, may be maintained in a locked position by means of the ratchet, 35. The spring, 36, tends to maintain the shoe, 32, out of contact with said brake drum.

For purposes of convenience I have shown the lever, 34, where it may be used as a foot lever, however, it may be placed in such a position to be operated manually without departing from the spirit of my invention.

Having thus described the elements which constitute my improved tire spreader, the operation of my device will be first to open the fingers, 16, as shown in the dotted position of Fig. 1. The tire is then placed on the fingers, 7, after they have been set the desired distance apart. The fingers, 16, are then closed and the air allowed to flow through the line, 19, which forces the piston rod, 9, and consequently the fingers, 16, outwardly and maintains said tire in a position for examination purposes. The entire device may be rotated until the position is reached in which the operator desires to work on said tire. The foot lever, 34, is then pressed, locking the apparatus in the desired position. After the work has been completed, air is then allowed to pass through the ring, 20, which forces the fingers, 16, back into their normal or closed position. Said fingers are then opened and the tire removed.

It will be seen from the foregoing that my invention has distinct advantages over the older type of machines of a similar nature in use at the present time.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A tire spreader comprising a cylinder, a piston and piston rod slidable therein, a plurality of apertured braces extending from said cylinder, and an L bar having one arm slidable through the apertures of said braces and the other arm located at right angles to said piston rod and secured thereto, to maintain the force directly in line with the object upon which the force is to be exerted.

2. A tire spreader comprising a cylinder, a piston and piston rod slidable therein, a plurality of apertured braces extending at substantially a ninety degree angle from said cylinder, and an L bar having its longer arm slidable through the apertures of said braces and the other arm located at right angles to said piston rod and rigidly secured near its end to the outer extremity of said piston rod, whereby the force will be maintained directly in line with the object upon which the force is to be exerted.

3. A pneumatic tire spreader comprising a cylinder, a piston rod slidable therein, two apertured braces extending at substantially a ninety degree angle below said cylinder, an L bar having its longer arm slidable through the apertures of said braces and its shorter arm rigidly secured to the outer extremity of said piston rod and located at right angles thereto, and a plurality of bearings pivotally mounted in said apertures to contact the upper and lower surfaces of the arm of said L bar, whereby the force will be maintained directly in line with the object upon which the force is exerted, and jamming of such force will be prevented.

4. A tire spreader comprising in combination a base, an arm rotatably mounted thereon, members slidably mounted on said arm, tire grasping elements secured to each of said members, other tire grasping elements disposed adjacent said first named elements, and means to move said last named elements toward and away from said first named elements, said means including a cylinder secured to each of said slidable members having a piston and piston rod slidable therein, and an L bar having one arm located at right angles to said piston rod and secured to one end thereof, said last named grasping elements being secured to and movable with said L bar.

5. A pneumatic tire spreader comprising in combination a base, an arm rotatably mounted thereon, plates slidably mounted on said arm, a plurality of fingers secured to each of said plates, a plurality of other fingers disposed adjacent said first named fingers, means to lock said arm in any desired position, means to regulate the distance between said plates, and means to force said last named fingers toward and away from said first named fingers including a cylinder secured to each of said plates having a piston and piston rod slidable therein, and an L bar having one arm at right angles to said piston rod secured near one end to said piston rod, said last named fingers being secured to and movable with said L bar.

OSCAR C. KALBFLEISCH.